Aug. 23, 1966           D. E. ERMINY           3,267,583
THREAD GAUGE ADAPTABLE TO GAUGING VARIOUS CHARACTERISTICS
OF MACHINE SCREW THREADS

Filed July 30, 1963           2 Sheets-Sheet 1

United States Patent Office 3,267,583
Patented August 23, 1966

3,267,583
THREAD GAUGE ADAPTABLE TO GAUGING VARIOUS CHARACTERISTICS OF MACHINE SCREW THREADS
Diamond E. Erminy, 4107 Connecticut Ave. NW., Washington, D.C.
Filed July 30, 1963, Ser. No. 298,713
8 Claims. (Cl. 33—199)

The present invention relates to a device for determining various characteristics of machine screw threads by the method of gauging.

The various devices used to gauge screw thread characteristics are commonly referred to as "screw thread gauges." Most of these devices are designed and intended to gauge only specific characteristics of screw threads as is, for example, the thread pitch gauge, the thread plug gauge, or the thread ring gauge.

Among the various screw thread gauges is a device called a "screw and nut locator" that gauges the thread size and thread pitch (or thread number) of screws and nuts. The device is comprised of screws (or bolts) and nuts that are attached to a flat rectangular plate and are arranged in two parallel columns, the screws (or bolts) being located in one column and the nuts in the other. Mateable screws (or bolts) and nuts are positioned adjacent to each other and arranged in sequence with respect to thread size and thread number.

This device suffers from several limitations. Firstly, while it does gauge some of the thread characteristics of screw thread fasteners, i.e., of screws (or bolts) and nuts, it cannot directly gauge thread characteristics of screw threads located on machinery or the like. Secondly, because the mounted screws (or bolts) and nuts cannot be located too close to one another if the device is to be usable, the device's compactness is inherently limited. Finally, its overall shape, particularly the protruding screws (or bolts) and nuts, makes the device bothersome to carry on one's person. This defect seriously restricts extensive use of the device.

Accordingly, an object of the present invention is to provide a device that can be adapted to the gauging of any or all screw thread characteristics.

Another object is to provide a device that can directly gauge screw threads whether they be the threads of screw thread fasteners or threads located on machinery or the like.

Another object is to provide a device that displays the various representative threads of the thread gauge.

A further object is to provide a screw thread gauge of such shape and size that it can be easily carried on one's person.

Other objects and advantages of the invention will become more fully apparent from the description of the annexed drawings disclosing several embodiments of the present invention wherein.

Figure 1:
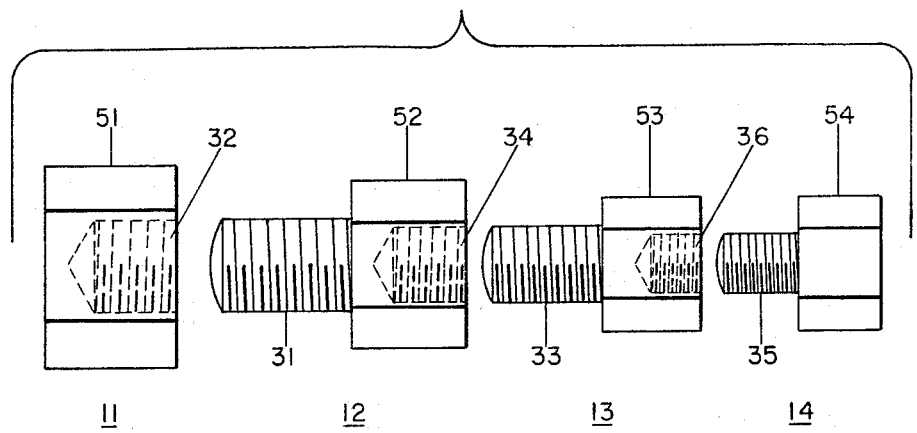
FIG. 1 is an exploded side view of an embodiment that will be referred to as the first embodiment of the invention.

In practicing the present invention, two types of elements are employed; one is termed an interior element and the other, an exterior element. An interior element has two screw threads, one at each end of the element. Both of these screw threads may be male, or both may be female, or one may be male and the other female. An exterior element has a screw thread at only one of its ends. This screw thread may be either male or female. The size and shape of either an interior or an exterior element is selected so that the handling of the element may be facilitated and/or the thread characteristics of its screw thread or threads may be inscribed on the unthreaded exterior surface of the element.

The threads of the interior and exterior elements are comprised of those threads that gauge directly the particular screw thread characteristics of interest. Each screw thread of each element has a counterpart screw thread on another element, and when each screw thread has been mated with its counterpart, the various elements are connected to each other. The ensemble of connected elements constitutes the assembled thread gauge of the present invention. A preferred embodiment of the invention exposes to view several threads of each male screw thread when the gauge is assembled and thereby provides a display of the representative thread types by the assembled thread gauge.

Refer now to the annexed drawings, wherein like reference characters designate like or corresponding parts throughout the several views. Elements 12, 13, 22, and 23 are interior elements, whereas elements 11, 14, 21, and 24 are exterior elements. Interior elements 12 and 13 each have a male screw thread 31 and 33, respectively and a female screw thread 34 and 36, respectively. Interior element 22 has two male screw threads 41 and 43, while interior element 23 has two female screw threads 44 and 46. Exterior elements 11 and 21 each have a female screw thread 32 and 42, respectively, while exterior elements 14 and 24 each have a male screw thread 35 and 45, respectively.

The shape of an element's unthreaded exterior surface, namely, 51, 52, 53, and 54 in FIGS. 1–4 and 61, 62, 63, and 64 in FIGS. 5–8, is that of a hexagonal right prism. The height of the prism may be selected so as to provide adequate area on the prism flats for the inscription of the thread characteristics of the element's screw threads and of useful information such as the tap and body drill sizes associated with such screw threads and the like, or to facilitate the handling of the element, or to reduce the overall length of the element thereby allowing its use in confined regions, or for other like purposes. The distance between the parallel flats of the prism may be adjusted to be equal to the distance between the parallel flats of a hexagonal nut whose female screw thread has the same thread size as the smaller screw thread of the gauge element, in the first and second embodiments, and the larger screw thread of the gauge element, in the third and fourth embodiments. Consequently, a tentative identification of the screw threads of a hexagonal nut can be made by comparing the distance between the parallel flats of the nut with the corresponding distances of the various hexagonal right prisms of the thread gauge. The shape and size of the unthreaded exterior portion of an element may be selected to accommodate other preferences or needs.

Figures 2, 3:
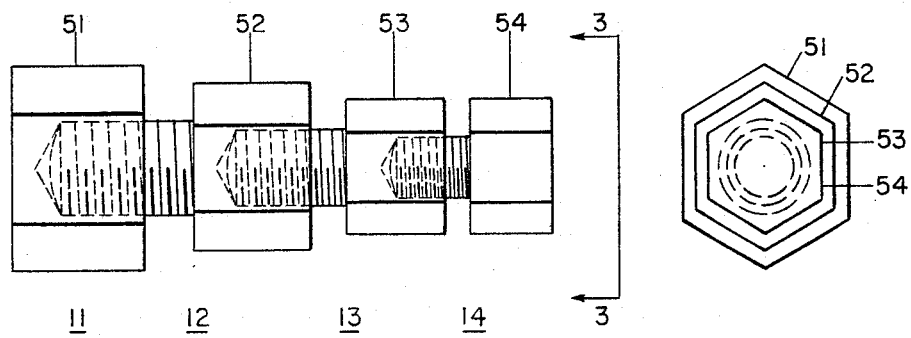
FIG. 2 is a side view of the first embodiment of the invention after the device shown in FIG. 1 has been assembled.
FIG. 3 is an end view taken on the line 3—3 of FIG. 2, looking in the direction of the arrows.
Figure 4:
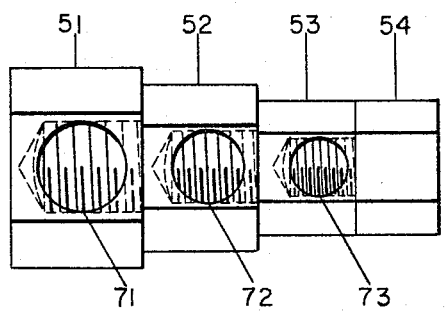
FIG. 4 is an assembled side view of an alternate to the first embodiment which will be referred to as the second embodiment of the invention.
Figure 5:
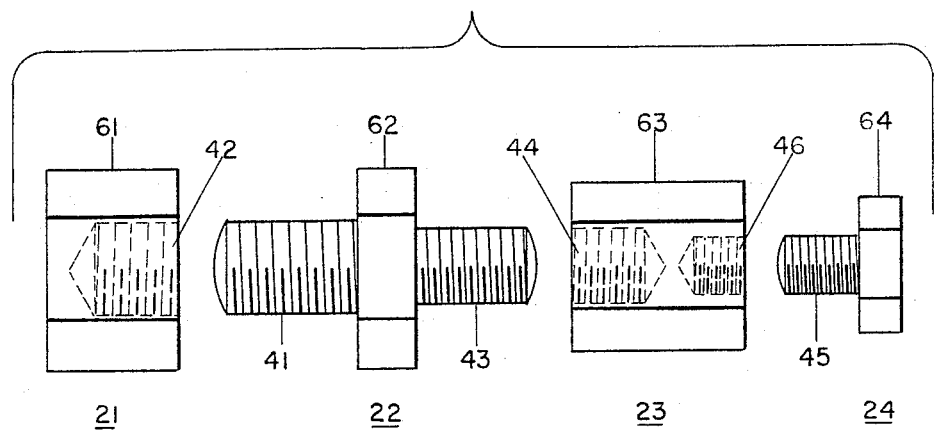
FIG. 5 is an exploded side view of another embodiment that will be referred to as the third embodiment of the invention.
Figures 6, 7:
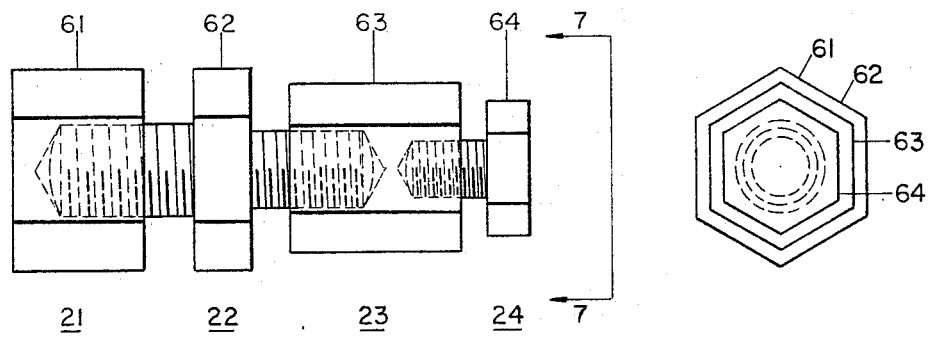
FIG. 6 is a side view of the third embodiment of the invention after the device shown in FIG. 5 has been assembled.
FIG. 7 is an end view taken on the line 7—7 of FIG. 6, looking in the direction of the arrows.
Figure 8:
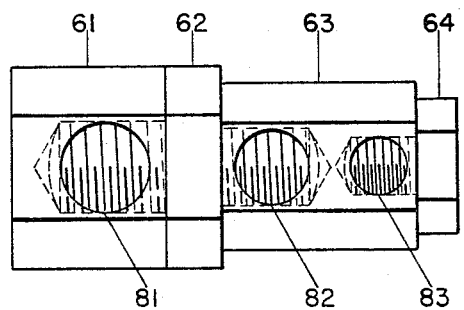
FIG. 8 is an assembled side view of an alternate to the third embodiment which will be referred to as the fourth embodiment of the invention.

The male screw threads 31, 33, and 35 and the female screw threads 32, 34, and 36 are respective counterparts as is indicated by FIG. 1. The mating of these screw threads, each with its counterpart, unites the interior elements 12 and 13, element 12 being a member of a first group and element 13, a member of a second group of interior elements, and the exterior elements 11 and 14 to form an assembled thread gauge of the first embodiment of the invention which is shown by FIG. 2. Likewise, the male screw threads 41, 43, and 45 and the female screw threads 42, 44, and 46 are respective counterparts as is indicated by FIG. 5. The mating of these screw threads, each with its counterpart, unites the interior elements 22 and 23, element 22 being a member of a first group and element 23, a member of a second group of interior elements, and the exterior elements 21 and 24 to form an assembled thread gauge of the third embodiment of the invention which is shown by FIG. 6. FIGS. 4 and 8 show an assembled thread gauge of the second and fourth embodiments, respectively.

As is shown by FIGS. 2, 4, 6, and 8, each assembled thread gauge displays several threads of each male screw thread. This display enables a given screw thread with unknown characteristics to be compared to specimens of the representative screw threads of any one of these thread gauges without first having to disassemble that gauge. The male threads that are displayed by either of the assembled thread gauges shown by FIGS. 2 and 6 are those male threads that remain unmated after these gauges have been completely assembled. It is understood, of course, that the number of male threads that are to remain unmated as well as the number that are to be mated when either gauge is completely assembled may be selected to accommodate other preferences or needs. The male threads that are displayed by the assembled thread gauges shown by FIGS. 4 and 8 are those male threads that are exposed to view through holes located in those portions of each element which embody a female screw thread. Specifically, in FIG. 4 portions 51, 52, and 53 contain holes 71, 72, and 73, respectively, and in FIG. 8 portion 61 contains hole 81, while portion 63 contains holes 82 and 83. These holes not only serve as windows through which are displayed the several male threads of each male screw thread when each gauge is completely assembled but also make feasible shorter elements as well as a shorter assembled thread gauge. The shape and size of these holes may be selected to accommodate other preferences or needs.

The screw threads of the various elements of a thread gauge may be arranged so that when the gauge is assembled, the threads are ordered in sequence according to thread size. Because the size of each gauge element changes progressively from element to element for such an arrangement, sequential ordering of the screw threads facilitates the location of a given thread size and simplifies the design and construction of the thread gauge. It is understood, of course, that the screw threads of the various elements may be arranged so that other thread characteristics are sequentially ordered.

A thread gauge may be made of a suitable material such as metal, plastic, or the like. If made of metal, the thread gauge may be plated or treated with appropriate materials (case hardened) so as to make the threads of the gauge elements more wear-resistant and/or corrosion-resistant.

Consider a thread gauge that is constructed in accordance with the invention and which has a representative male and female screw thread of every type, series, size, pitch, lead, and tolerance class. The use of such a gauge allows these thread characteristics of a screw thread to be determined in the following manner:

A given screw thread with unknown thread characteristics is compared with the screw threads of the various thread types displayed by the gauge. From such a comparison, the thread type of the given thread is established. Then, those thread specimens having a thread size, a thread pitch, and a thread lead similar to the given screw thread are located by comparing and matching the given screw thread with the various displayed screw threads of that thread type. From this comparison, the thread size, thread pitch, and thread lead as well as the thread series of the given screw thread are tentatively established. Those gauge elements whose threads are presumed to be counterparts to the given screw thread in thread size, thread pitch, and thread lead are then detached from the assembled gauge and the given screw thread is trial mated with each of them. From the successful trial matings, the thread size, thread pitch, and thread lead of the given screw thread are definitely established. Finally, the tolerance class of the given screw thread is determined by trial mating the given screw thread with the screw threads having the same thread size, thread pitch, and thread lead but representing the various tolerance classes. The technique employed is the "go-not go" technique that is well known in the art of gauging for the determination of this thread characteristic.

In summary, by constructing a thread gauge comprised of simple and readily detachable gauging elements, threads located on machinery or the like as well as the threads of screw thread fasteners can be gauged directly. Furthermore, because the threads of the gauge elements serve also as the mounts for their respective counterpart screw threads, such a thread gauge achieves a high degree of compactness when assembled. Finally, by judicious selection of the threads of the gauge elements, a thread gauge can be constructed in accordance with the present invention so that it would gauge any or all of the thread characteristics of any or all thread series of any or all thread types of machine screw threads. For example, by a judicious choice of the threads of the gauge elements, a device can be constructed to gauge the tolerance class of a specific screw thread of a specific thread series, or to gauge the thread size and thread pitch (or thread number) of a selection of screw threads of one of the established screw thread series, such as the Unified and American Screw Thread Series or the International Metric Thread System or perhaps of several such series.

Many modifications and variations of the present invention are possible in the light of the above teachings. These, of course, depend on the purposes for which such a device is intended. It is therefore to be understood that, within the scope of the appended claims, the invention may be practiced otherwise than as specifically described.

What is claimed is:

1. A device for determining various machine screw thread characteristics comprising: an assembly of elements including a first and second group of interior elements, each element of said first group of interior elements having a pair of machine screw threads, one of which is different from the other in at least one thread characteristic and at least one of which is a male screw thread, and each element of said second group of interior elements having a pair of machine screw threads, one of which is different from the other in at least one thread characteristic and at least one of which is a female screw thread, the screw threads of each interior element in said first and second group being selected so that they comprise a varied set of screw threads of which a predetermined number are gauging threads and so that the interior elements in said first and second group may be mounted in threaded engagement with each other to form a single unit of interior elements, the interior elements in said first and second group being constructed in a manner such that when the male and female screw threads of the assembled unit of interior elements are engaged but not completely screwed together, two or more interior elements of the assembled unit are not constrained to maintain the same angular orientation relative to each other.

2. The device set forth in claim 1 wherein at least one of the second group of interior elements with a female screw thread includes means for exposing a portion of the male screw thread of the interior element of the first group with which it is engaged when the engaged male and female screw threads are completely screwed together.

3. The device set forth in claim 1 wherein the depth of the female screw thread of at least one of the second group of interior elements and the length of the male screw thread of the interior element of the first group with which it is engaged are selected so that several threads of the male screw thread remain unmated and exposed to view when the engaged male and female screw threads are completely screwed together.

4. The device set forth in claim 1 wherein at least one of the second group of interior elements with a female screw thread comprises a body with a threaded bore and an opening transverse to and entering into the threaded bore such that, when the threaded bore and the male screw thread of the interior element of the first group with which it is engaged are completely screwed together, several threads of the male screw thread are exposed to view through the opening.

5. A device for determining various machine screw thread characteristics comprising: an assembly of elements including a first and second group of interior elements, each element of said first and second group of interior elements having a male and a female machine screw thread, one of which is different from the other in at least one thread characteristic, the screw threads of each interior element in said first and second group being selected so that they comprise a varied set of screw threads of which a predetermined number are gauging threads and so that the interior elements in said first and second group may be alternately mounted in threaded engagement with each other to form a single unit of interior elements, the interior elements in said first and second group being constructed in a manner such that when the male and female screw threads of the assembled unit of interior elements are engaged but not completely screwed together, two or more interior elements of the assembled unit are not constrained to maintain the same angular orientation relative to each other.

6. The device set forth in claim 5 wherein at least one of the second group of interior elements with a female screw thread includes means for exposing a portion of the male screw thread of the interior element of the first group with which it is engaged when the engaged male and female screw threads are completely screwed together.

7. A device for determining various machine screw thread characteristics comprising: an assembly of elements including a first and second group of interior elements, each element of said first group of interior elements having two male machine screw threads, one of which is different from the other in at least one thread characteristic, and each element of said second group of interior elements having two female machine screw threads, one of which is different from the other in at least one thread characteristic, the screw threads of each interior element in said first and second group being selected so that they comprise a varied set of screw threads of which a predetermined number are gauging threads and so that the interior elements in said first and second group may be alternately mounted in threaded engagement with each other to form a single unit of interior elements, the interior elements in said first and second group being constructed in a manner such that when the male and female screw threads of the assembled unit of interior elements are engaged but not completely screwed together, two or more interior elements of the assembled unit are not constrained to maintain the same angular orientation relative to each other.

8. The device set forth in claim 7 wherein at least one of the second group of interior elements with a female screw thread includes means for exposing a portion of the male screw thread of the interior element of the first group with which it is engaged when the engaged male and female screw threads are completely screwed together.

References Cited by the Examiner

UNITED STATES PATENTS

| 2,331,882 | 10/1943 | Almquist | 33—199 |
| 2,665,489 | 1/1954 | Cunningham | 33—164 |
| 2,853,787 | 9/1958 | Dyer | 33—174 |

FOREIGN PATENTS

| 354,006 | 8/1931 | Great Britain. |

OTHER REFERENCES

Giesecke, Mitchell, Spencer: Mechanical Drawing, The Macmillan Co., 1949, Page 809 relied upon.

LEONARD FORMAN, *Primary Examiner.*

ISAAC LISANN, J. D. BOOS, *Assistant Examiners.*